(12) United States Patent
Hiscock et al.

(10) Patent No.: US 6,347,073 B1
(45) Date of Patent: Feb. 12, 2002

(54) METHOD AND SYSTEM FOR CONTROLLING DATA TRANSFER BETWEEN A LOGICAL SWITCH SET AND OUTSIDE NODES

(75) Inventors: James Scott Hiscock, Rockport; Myles Kimmitt, Shrewsbury, both of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/069,623

(22) Filed: Apr. 29, 1998

(51) Int. Cl.$^7$ .................. G01R 31/08; G06F 11/00; G08C 15/00; H04J 1/16; H04J 3/14
(52) U.S. Cl. .................. 370/217; 370/244; 370/245; 370/248; 714/25
(58) Field of Search ................ 370/216, 217, 370/218, 219, 220, 221, 225, 389, 400, 410, 242, 244, 248, 245; 714/1, 25, 26, 27

(56) References Cited
U.S. PATENT DOCUMENTS

| | | | | |
|---|---|---|---|---|
| 5,187,706 A | * | 2/1993 | Frankel et al. .............. 370/217 |
| 5,737,316 A | * | 4/1998 | Lee .............................. 370/248 |
| 5,740,157 A | * | 4/1998 | Demiray et al. ............ 370/219 |
| 5,909,686 A | * | 6/1999 | Muller et al. ............... 707/104 |
| 5,982,743 A | * | 11/1999 | Kusano ...................... 370/217 |
| 5,982,745 A | * | 11/1999 | Walff et al. ................. 370/219 |
| 6,111,852 A | * | 8/2000 | Leung et al. ............... 370/217 |

* cited by examiner

*Primary Examiner*—Ajit Patel
*Assistant Examiner*—Bob A. Phunkulh

(57) ABSTRACT

A plurality of independent control lines are used by I/O modules to determine which switch of a redundant switch set is the active or primary switch. Each line is driven by a different source. Each of these control lines are driven by one of a plurality of judges an each judge can read the other control lines which they are not driving. All the I/O modules can only read the control lines. Each judge makes a decision as to which switch should be the primary switch. Each decision is conveyed using the control lines. The I/O modules use these control lines to direct a multiplexer of the respective outside node to connect to the primary switch. A majority rules algorithm is used to always obtain the correct result in the face of a single error. The criteria used by the judges to decide which switch should be the primary switch is dependent of this mechanism.

17 Claims, 2 Drawing Sheets

METHOD AND SYSTEM FOR CONTROLLING DATA TRANSFER BETWEEN A LOGICAL SWITCH SET AND OUTSIDE NODES

FIELD OF THE INVENTION

The present invention relates to switches of a computer Local Area Network (LAN), and in particular to controlling the data flow to the plurality of switches inside a Logical Switch Set (LSS).

BACKGROUND OF THE INVENTION

In computer networks, a plurality of end stations can be connected together to form a Local Area Network (LAN). When the number of end stations is small, data can be sent from one end station, to all the other end stations, with each end station only reading data addressed to itself. However, when more and more end stations are connected together, and the amount of data to be transferred between the end stations increases, the amount of time that one station has access to the network decreases. This results in delays in transferring of data from one end station to the other.

Computer network switches, can divide a very large network into a plurality of Local Area Networks. A switch connects one Local Area Network to another Local Area Network, and only transfers data packets from one LAN to another LAN, if that data packet needs to be transferred to the other LAN. In this way, the amount of data packets that are transferred across a network is reduced.

The number of LAN's in computer networks are steadily increasing, and more and more switches are being used to connect the LAN's to each other, as well as to connect previously separate computer networks. This is causing computer networks to evolve into tremendous sizes, with many different possible connections between LAN's and end stations.

Switches are correspondingly transferring a greater number of data packets and the failure of a switch can have large and far ranging consequences. In order to increase the reliability of switches, and to reduce their complexity, Logical Switch Sets (LSS) are formed which are comprised of a plurality of switches. The plurality of switches are grouped together to form the LSS which operates as a single logic packet forwarding device. The grouping together of switches to form an LSS is described in Applicant's co-pending application having Ser. No. 09/014,548 filled on Jan. 28, 1998, and hereby incorporated by reference. The Logical Switch Set (LSS) is connected to a plurality of outside nodes. These outside nodes can be individual LAN's, end stations or ports to other switches, depending on the configuration of the overall network. All of the plurality of outside nodes have connections to each of the switches in the LSS.

In order to increase reliability of the LSS as a whole, one of the switches in the LSS is designated as a primary switch, and the other switches are designated as backup or redundant switches. The outside nodes then transfer the data packets to the primary switch and the primary switch then forwards the data packets to the appropriate output. The operating parameters of the redundant switches are kept similar to the operating parameters of the primary switch, and are updated substantially simultaneously with the primary switch. Should the primary switch fail, or links between the outside nodes and the primary switch fail, the outside nodes then transfer data to one of the backup or redundant switches. The chosen redundant switch then becomes the primary switch.

Coordination and control is needed between the outside nodes and the plurality of switches of the LSS, in order to have all the outside nodes properly recognize one of the switches as a primary switch, and to also recognize a failure of a primary switch, and chose a new primary switch.

SUMMARY AND OBJECTS OF THE INVENTION

It is a primary object of the present invention to provide control and coordination between the outside nodes and the individual switches of an LSS to designate one switch as a primary switch, and to recognize another switch as a primary switch, should the original primary switch fail.

The object of the present invention is accomplished by having each of the switches in the LSS, and a management means in the LSS perform diagnostic tests of the link means that connects the switches to the outside nodes and also tests the respective switch. The results of the diagnostic tests are shared among each of the switches and the management means, as well as the outside nodes, by transmitting the results on to a Switch Management Local Area Network (SMLAN). The SMLAN is separate from, and in parallel with, the link means. In particular each outside node has an I/O means and the SMLAN is connected to the I/O means of each node. A judge means of each switch and management means analyzes the results of the diagnostic tests and generates its own selection signal based on the results. The selection signals from each judge means is sent out on a separate selection line, and each judge means is able to read the selection lines of the other judge means. The I/O modules of the outside nodes are also able to read the selection lines. The selection lines are also separate from, and in parallel with, the link means and SMLAN connecting the outside nodes to the LSS.

Failures in any one of the links of the link means, or in one of the switches, can be difficult to detect, especially by just one switch or judge. A communication error, can be caused by the transmitter, the receiver, or the link connecting the two. A transmitter will not be aware of a communication error unless it receives feedback from the receiver. If a transmitter is supposed to receive feedback, does not receive feedback, the problem can be with the transmitter, the link to the receiver, the receiver, and/or the feedback link from the receiver to the transmitter. Therefore several different diagnostic tests need to be performed, and these tests need to be performed at the transmitter and the receiver, which in the case of the present invention involves both the switches and the I/O modules of the outside nodes. Each switch then makes its own determination as to its abilities to perform properly, and generates a corresponding type of selection signal. The I/O mean of each node reads the selection signals from each of the switches and the management means, and determines which of the switches is to be the primary switch. All subsequent data packets are then transferred to the primary switch. Each of the I/O means uses the same rules for determining the primary switch, and therefore all of the outside nodes simultaneously elect the same switch as the primary switch for transferring the data packets.

The management means provides an independent and unbiased determination to allow a majority rules algorithm to be used and thus always obtain a correct result should a single error occur in somewhere in the network. The management means also acts as a type of "tie-breaker" should two or more switches be equally qualified to perform as the primary switch.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
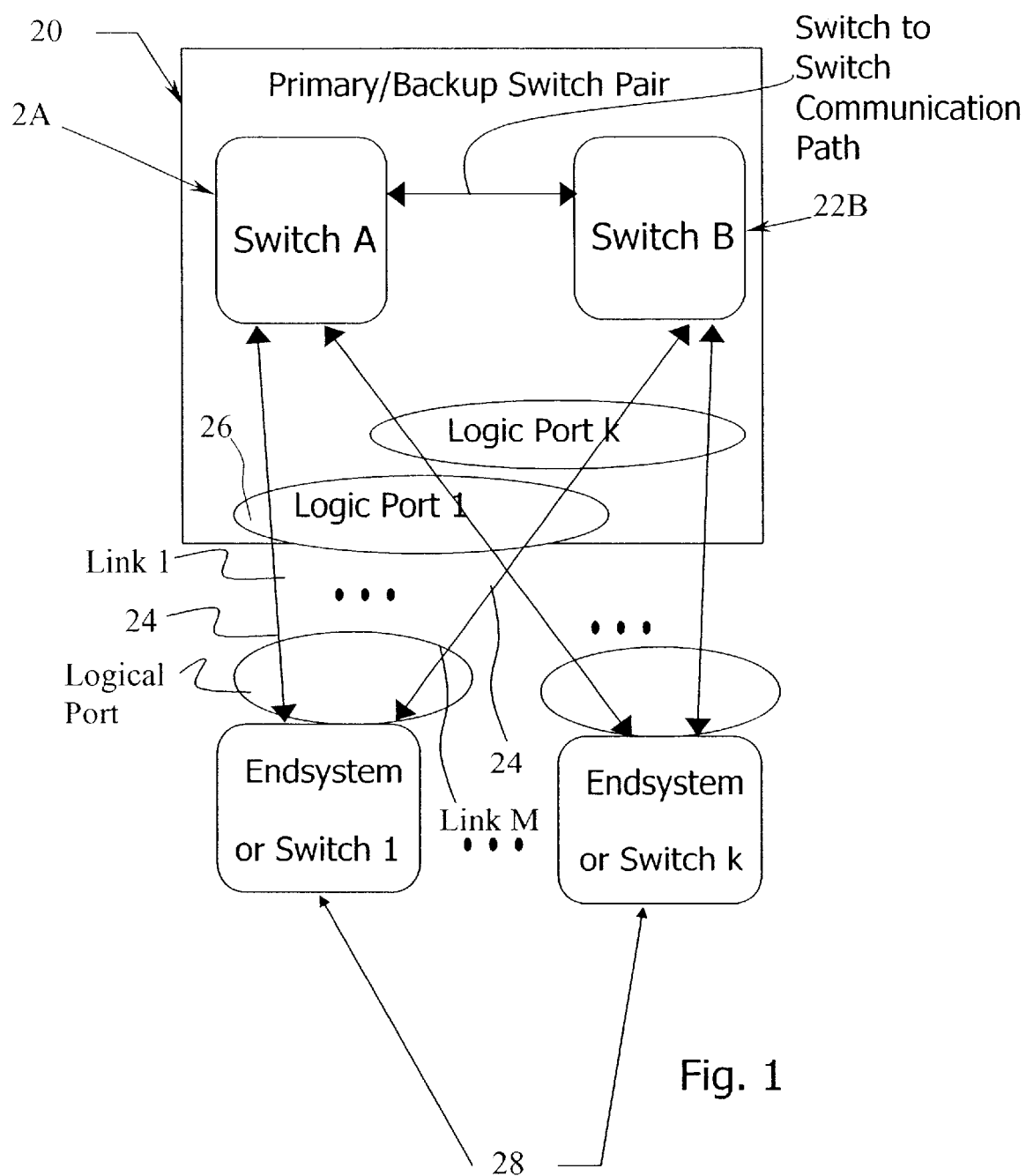
FIG. 1 is a schematic diagram showing the general scheme of the logical switch set according to the invention.
Figure 2:
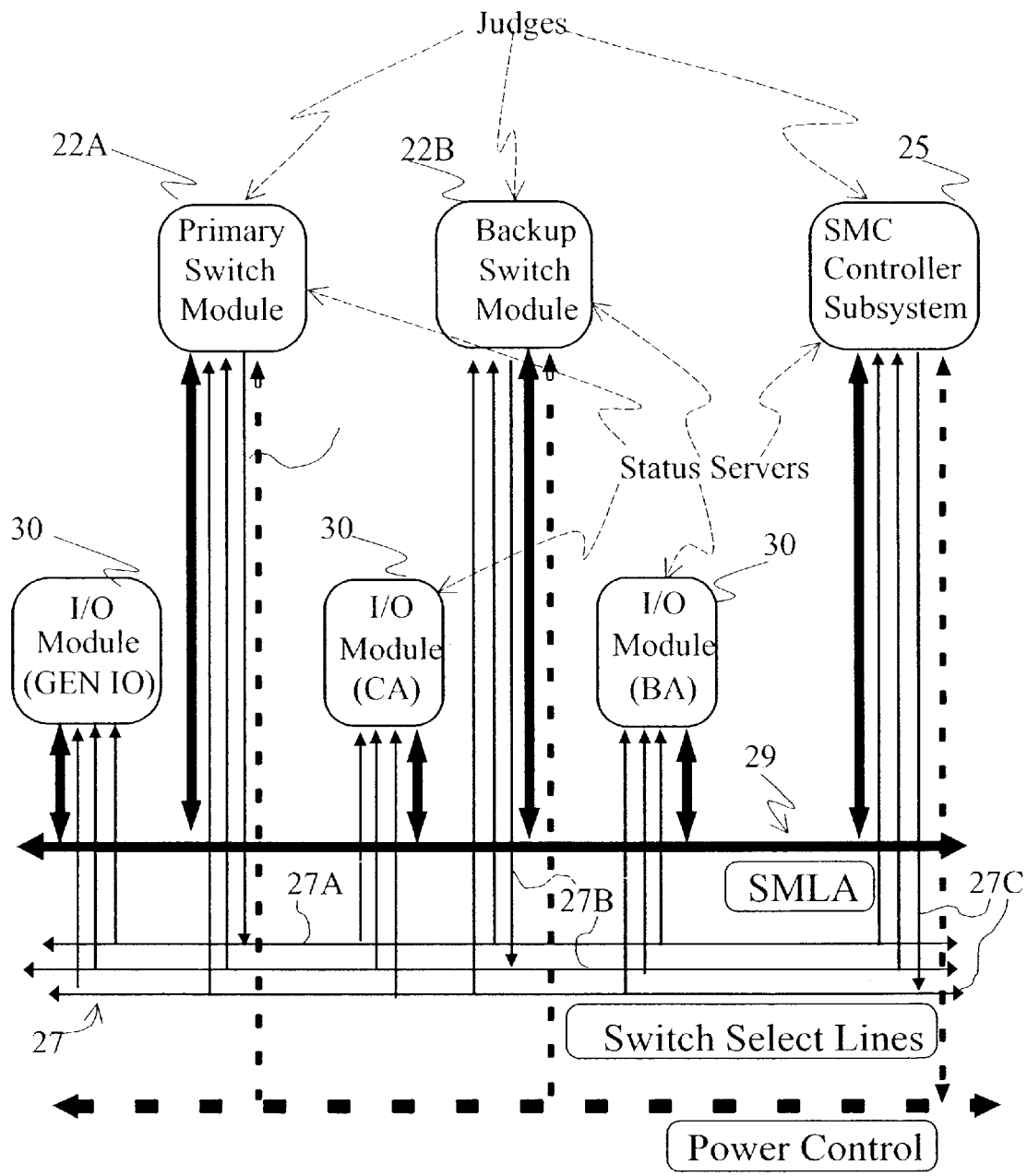
FIG. 2 is a schematic view showing the logical switch set of FIG. 1 as a primary/backup pair implemented with a controller for primary switch selection.

Referring to the drawings, and in particular to FIG. 1, the invention comprises a Logical Switch Set (LSS) 20 which comprises two or more switches 22 that together act as a single packet forwarding device with specific connection rules. The LSS is a Redundant Switch Set (RSS), providing a primary/backup switch pair 22a and 22b. The switches 22a and 22b act as one logical device and have one logical port 26 for each outside node 28 which can either be an end system or an outside switch. Links 24 are provided for connecting the outside nodes 28 to the individual switches 22. All of the links 24 combined to form the link means connecting the outside nodes to the LSS 20. The outside nodes 28 are multiplexed to the switches 22 of the LSS 20 through the links 24. One switch assumes the role of the primary switch, providing the LAN interconnection and management, while the other switch is the backup switch, and stands ready to take over in the event of a failure on the primary switch. Only one link is active at a time, therefore only one of the two switches is supplying traffic to the LSS. Implementation techniques vary with network technology, and implementations are available for Ethernet, fast Ethernet, FDDI, token ring and ATM (asynchronous transfer node). In the preferred embodiment, there are two switches 22a and 22b. Each of the outside nodes 28 has an I/O module or means 30 which are connected to the switches 22 by the SMLAN 29 and the switch select lines 27. The LSS includes a management means 25 in the form of a switch management controller (SMC) and controller subsystem. The management means allows a majority rules algorithm to be used in the determination process and thus always obtain a correct result should a single error occur in somewhere in the network. The management means also provides an independent and unbiased determination to act as an impartial tie-breaker in the case of two or more switches being equally qualified to be a primary switch. Each outside node 28 has its own logical port 26 on the LSS 20. In this way, the plurality of switches 22 acts as a single logical switch and therefore can be easily integrated into the topology of the computer network.

Each of the switches 22, and the management means 25 include judge means for detecting a status of the link means and the respective switch 22. The judge means performs diagnostic tests and the results of these tests are shared among the other judges and I/O modules over the SMLAN 29. The SMLAN 29 and the switch select lines 27 are out of band signals or lines that are separate from, but parallel with, the links 24 of the link means.

The judges and I/O means 30 together form status servers which register, implicitly or explicitly, the ability to test the packet switch fabric and report the results on the SMLAN 29. The judges discover and coordinate the servers to gather switch fabric status. The judges gather information about the packet switch fabric status and each judge expresses their belief as to which switch should be active on their own respective switch select line 27. The I/O means 30 receive the active switch judgements from all three judges via the switch select lines 27 and determine from which switch module to receive traffic based on the voting of the three judges. This provides a voting system for an effective switch selection. Each judge can read the other two lines they are not driving. All the I/O means 30 can only read the switch select lines. A majority rules algorithm is used to always obtain the correct results in the face of a single error. The criteria used by the judges to decide which switch should be the primary switch is dependent of this mechanism.

Some of the criteria that can be used, is for every switch, and management means to send a "hello" signal to everybody else over the SMLAN 29. The judges would then use the present or absence of a "hello" signal to determine if a switch and it corresponding links are capable of being a primary switch. Another criteria for a backup switch to become a primary switch is if the backup switch has a set of ports which is a superset of the ports presently being served by the primary switch. A more involved criteria would have each node sending and confirming test messages through the switches.

In an embodiment with two switches 22a, 22b in an LSS 20, there will be a management means 25, to create a total of three switch select lines 27a corresponding to switch 22a, switch select line 27b corresponding to switch 22b and switch select line 27c corresponding to management means 25. The switches 22a, 22b transmit a 0 signal onto their respective switch select lines if they feel that they are qualified to be the primary switch. The switches 22a, 22b transmit a 1 signal onto their respective switch select lines if they feel that they are not qualified to be the primary switch. The management means 25 transmits a 0 onto switch select line 27c if it determines that switch 22a should be the primary switch, and transmits a 1 onto switch select line 27c if it determines that switch 22b should be the primary switch, Each of the I/O modules reads the switch select lines 27a–c, and determines the primary switch module according to the following table.

| Select line 27A | Select line 27B | Select line 27C | Result |
| --- | --- | --- | --- |
| 0 | 0 | 0 | Switch 22A |
| 0 | 0 | 1 | Switch 22B |
| 0 | 1 | 0 | Switch 22A (no error) |
| 0 | 1 | 1 | Switch 22A |
| 1 | 0 | 0 | Switch 22B |
| 1 | 0 | 1 | Switch 22B (no error) |
| 1 | 1 | 0 | Switch 22A |
| 1 | 1 | 1 | Switch 22B |

If the reading of the switch select lines 27A–C is 000 or 010 or 011 or 110, switch 22A is enabled as the primary switch. If the switch select lines 27A–C read 001 or 100 or 101 or 111, the switch 22B is enabled as the primary switch.

The type of diagnostic tests that can be performed in an LSS 10 are further described in Applicant's co-pending application 09/014,548.

The judges and the I/O means thus form a voting and vote collection system that will always uniformly determine a capable one of the switches and corresponding link to which the outside nodes can transmit the data. The voting and vote collection system uniformly determine the capable switch both when the multiplexer control system is free of errors and includes a single error.

The present invention is not limited to the above embodiment, but instead can be used with any number of switches, or the I/O means 30 could use a different algorithm based on the selection signals read from the switch select lines.

The features described in the specification, drawings, abstract and claims can be used individually, and in arbitrary combinations, for practicing the present invention.

While specific embodiments of the invention have been shown and described in detail to illustrate the application of the principles of the invention, it will be understood that the invention may be embodied otherwise without departing from such principles.

What is claimed is:

1. A multiplexer control system for an outside node of are redundant computer network switch set, the system comprising:

link means connecting said switch set to the outside node;
    two switches grouped together to form the switch set as a single logic packet forwarding device, one of said switches functioning as a primary switch, and a remainder of said switches being a backup switch, said link means including a separate link from each of said switches to the outside node, said each switch including judge means for detecting a status of said link means, each said judge means generating a selection signal based on a respective detected status of said link means, said each judge means of said switches performs diagnostic tests of a respective switch and said link means;
    management means connected to said two switches and for also detecting a respective status of said link means and said switches, said management means also including judge mean for generating a separate selection signal based on said respective detected status of said switches and said link means, said judge means of said management means performs diagnostic tests of said switch means and said link means, a type of said selection signal is based on results from respective said diagnostic tests, said each judge means of said two switches generates a first signal if said results indicate said respective switch is operational, said each judge means of said two switches generates a second signal if said results indicate said respective switch is non-operational, said judge means of said management means generates said first signal if said results indicate a first of said two switches is better qualified to receive said data from the outside node, said judge means of said management means generates said second signal if said results indicate a second of said two switches is better qualified to receive said data from the outside node;
    a plurality of switch select lines for transmitting said separate selection signals from said switches and said management means to the outside node;
    means connected to the outside node and reading said selection signals, said I/O means determining to which of said links and said switches the outside node will transmit data based on said selection signals.

2. A method for controlling data flow to a logical switch set, the process comprising:

detecting a status of each switch in said logical switch set and corresponding link of the logical switch set;
    generating a selection signal from each said switch based on said respective detected status of said links;
    generating a second selection signal from a management means of the logical switch set, said management means being connected to said plurality of switches and detecting a status of said links and said switches, said selection signal generated by said management means being based on said respective detected status of said switches and said links;
    transmitting said selection signals to a plurality of outside nodes;
    determining in each of said outside nodes to which of said links and said switches the outside node will transmit data based on said selection signals, said determining including forming a voting and vote collection system that will always uniformly determine a capable one of said switches and corresponding link when the logical switch set is free of errors and includes a single error.

3. A method in accordance with claim 2, wherein:

said selection signals are transmitted separately and in parallel with said data.

4. A method in accordance with claim 2, wherein:

said detecting of status and generating of respective said selection signals is performed separately by each said switch and management means separately performing diagnostic tests.

5. A method in accordance with claim 2, wherein:

said detecting includes performing diagnostic tests by each of said switches and management means;
    a type of said selection signal generated is determined by results of said diagnostic tests.

6. A method in accordance with claim 5, further comprising:

transmitting said results of said diagnostic tests of each said switch and management means to all other said switches, said management means and said outside nodes;
    generating said type of selection signal at each said switch based on received said results of said diagnostic tests of all of said switches and said management means.

7. A method in accordance with claim 6, further comprising:

transmitting said selection signal of each said switch and management means to all other said switches, said management means and said outside nodes;
    generating said type of selection signal at each said switch based on received said selection signals.

8. A method in accordance with claim 2, wherein:

said selection signal is generated by each said switch to determine if a respective said switch is qualified to transfer data between the outside nodes.

9. A multiplexer control system for an outside node of a redundant computer network switch set, the system comprising:

link means connecting said switch set to the outside node;
    a plurality of switches grouped together to form the switch set as a single logic packet forwarding device, one of said switches functioning as a primary switch, and a remainder of said switches being backup switches, said link means including a separate link from each of said switches to the outside node, said each switch including judge means for detecting a status of said link means, each said judge means generating a second selection signal based on a respective detected status of said link means, said each judge means performs diagnostic tests of a respective switch and said link means, a type of said selection signal is based on results from respective said diagnostic tests;

management means connected to said plurality of switches and for also detecting a respective status of said link means and said switches, said management means also including judge means for generating a second selection signal based on said respective detected status of said switches and said link means;

a plurality of switch select lines for transmitting said separate selection signals from said switches and said management means to the outside node;

I/O means connected to the outside node and reading said selection signals, said I/O means determining to which of said links and said switches the outside node will transmit data based on said selection signals, said judge means and said I/O means form a voting and vote collection system that will always uniformly determines a capable one of said switches and corresponding link when the multiplexer control system is free of errors and includes a single error.

10. A system in accordance with claim 9, wherein:
said each judge means of said switches performs diagnostic tests of a respective switch and said link means, said judge means of said management means performs diagnostic tests of said switch means and said link means, a type of said selection signal is based on results from respective said diagnostic tests.

11. A system in accordance with claim 9, wherein:
said each judge means reads said selection signals from remaining said judge means;
said type of selection signal generated by said respective judge means being also based on said selection signals received from said remaining means.

12. A system in accordance with claim 9, wherein:
said I/O means uses a majority rules algorithm to determine to which of said links and said switches the outside node will transmit said data.

13. A system in accordance with claim 9, further comprising:
a plurality of the outside nodes connected to said each switch by said link means, each outside node reading said selection signals and determining to which of said links and said switches each outside node will transmit data.

14. A system in accordance with claim 13, wherein:
each outside node similarly determines to which of said links and said switches each outside node will transmit data.

15. A system in accordance with claim 9, wherein:
said switch select lines are separate from, and are in parallel with, said link means transferring data from said the outside node to the logical switch set.

16. An apparatus in accordance with claim 9, wherein:
said each judge means of said switches generates said selection signals to indicate if a respective said switch is qualified to transfer data between the outside nodes.

17. A multiplexer control system for an outside node of a redundant computer network switch set, the system comprising:
link means connecting said switch set to the outside node;
a plurality of switches grouped together to form the switch set as a single logic packet forwarding device, one of said switches functioning as a primary switch, and a remainder of said switches being backup switches, said link means including a separate link from each of said switches to the outside node, said each switch including judge means for detecting a status of said link means, each said judge means generating a second selection signal based on a respective detected status of said link means, said each judge means performs diagnostic tests of a respective switch and said link means, a type of said selection signal is based on results from respective said diagnostic tests, said each judge means of said switches generates a first signal if said results indicate said respective switch is operational, said each judge means of said switches generates a second signal if said results indicate said respective switch is non-operational;

management means connected to said plurality of switches and for also detecting a respective status of said link means and said switches, said management means also including judge means for generating a second selection signal based on said respective detected status of said switches and said link means;

a plurality of switch select lines for transmitting said separate selection signals from said switches and said management means to the outside node;

I/O means connected to the outside node and reading said selection signals, said I/O means determining to which of said links and said switches the outside node will transmit data based on said selection signals.

* * * * *